US008954603B2

(12) United States Patent
Horibuchi

(10) Patent No.: US 8,954,603 B2
(45) Date of Patent: Feb. 10, 2015

(54) COMMUNICATION DEVICE AND COMMUNICATION METHOD OF THE SAME

(75) Inventor: Takaaki Horibuchi, Saitama (JP)

(73) Assignee: Oki Electric Industry Co., Ltd., Tokyo (JP)

(*) Notice: Subject to any disclaimer, the term of this patent is extended or adjusted under 35 U.S.C. 154(b) by 687 days.

(21) Appl. No.: 12/847,422

(22) Filed: Jul. 30, 2010

(65) Prior Publication Data

US 2011/0078326 A1 Mar. 31, 2011

(30) Foreign Application Priority Data

Sep. 30, 2009 (JP) ................................ 2009-226773

(51) Int. Cl.
*G06F 15/16* (2006.01)
*H04L 29/12* (2006.01)

(52) U.S. Cl.
CPC ......... *H04L 61/2514* (2013.01); *H04L 61/1511* (2013.01); *H04L 29/12377* (2013.01); *H04L 61/2517* (2013.01); *H04L 29/12367* (2013.01); *H04L 29/12066* (2013.01)
USPC ............ 709/245; 709/238; 709/242; 709/246

(58) Field of Classification Search
USPC ........................... 709/238, 242, 220, 245, 246
See application file for complete search history.

(56) References Cited

U.S. PATENT DOCUMENTS

| 6,006,272 | A  | * | 12/1999 | Aravamudan et al. | ........ | 709/245 |
| 6,058,431 | A  | * | 5/2000  | Srisuresh et al.  | ............ | 709/245 |
| 6,993,595 | B1 | * | 1/2006  | Luptowski et al.  | ........... | 709/245 |
| 7,043,564 | B1 | * | 5/2006  | Cook et al.       | .................... | 709/246 |
| 7,529,810 | B2 | * | 5/2009  | Goto et al.       | .................... | 709/219 |
| 7,600,026 | B2 | * | 10/2009 | Chen et al.       | .................... | 709/227 |
| 7,752,334 | B2 | * | 7/2010  | Paunikar et al.   | ............. | 709/245 |
| 7,774,475 | B2 | * | 8/2010  | Satzke            | .......................... | 709/227 |
| 7,787,459 | B2 | * | 8/2010  | Yuan et al.       | .................... | 370/392 |
| 7,826,401 | B2 | * | 11/2010 | Swanson et al.    | ............. | 370/261 |
| 7,848,352 | B2 | * | 12/2010 | Tojo et al.       | .................... | 370/468 |

(Continued)

FOREIGN PATENT DOCUMENTS

| EP | 1793563      | A1 | 6/2007  |
| EP | 1903742      | A1 | 3/2008  |
| JP | 2002-152260  | A  | 5/2002  |
| JP | 2003-324482  | A  | 11/2003 |
| JP | 2006-135704  | A  | 5/2006  |
| WO | WO-2005/029877 | A2 | 3/2005  |

OTHER PUBLICATIONS

P. Srisuresh et al., "RFC2663-IP Network Address Translator (NAT) Terminology and Considerations", Network Working Group, http://www.faqs.org/rfcs/rfc2663.html.

P. Srisuresh et al., "RFC2663-IP Network Address Translator (NAT) Terminology and Considerations", Network Working Group, http://www.faqs.org/rfcs/rfc2663.html, Aug. 1999.

*Primary Examiner* — Jimmy H Tran
(74) *Attorney, Agent, or Firm* — Rabin & Berdo, P.C.

(57) ABSTRACT

In the gateway device, the global address (GA) of the host table is set to the same value, and the GA and the local port (LP) of the transfer table are respectively set to the same value. In the IP packet analysis unit, the sorting unit analyzes the packet from the WEB client and sorts the destination of the packet, the redirection unit supplies the GA and the global port (GP) to the WEB client that has made a request by the packet according to a result of analysis to perform redirection, and the translation/transfer unit analyzes the packets transmitted through the sorting unit, translates the addresses (GA/LA: local address) and the ports (GP/LP) respectively with each other and transfers the translated packets, and then the procedure after connection establishment is repeated.

4 Claims, 19 Drawing Sheets

EXEMPLARY CONFIGURATION OF GATEWAY DEVICE

(56) References Cited

U.S. PATENT DOCUMENTS

| | | |
|---|---|---|
| 8,149,095 B2 * | 4/2012 | Hayashi et al. .......... 340/286.02 |
| 2002/0083342 A1 | 6/2002 | Webb et al. |
| 2003/0149789 A1 * | 8/2003 | Hoffmann .................... 709/245 |
| 2003/0177236 A1 * | 9/2003 | Goto et al. .................... 709/225 |
| 2004/0125801 A1 | 7/2004 | Nawata |
| 2006/0209856 A1 * | 9/2006 | Tojo et al. ..................... 370/401 |
| 2009/0072991 A1 * | 3/2009 | Hayashi et al. ............... 340/825 |
| 2010/0030839 A1 * | 2/2010 | Ceragioli et al. ............. 709/201 |

* cited by examiner

EXEMPLARY CONFIGURATION OF GATEWAY DEVICE

EXEMPLARY CONFIGURATION OF COMMUNICATION SYSTEM

FIG.3

| FQDN | GLOBAL ADDRESS | GLOBAL PORT |
|---|---|---|
| www.1.com | 1.1.1.1 | 10000 |
| www.2.com | 1.1.1.1 | 10001 |
| www.3.com | 1.1.1.1 | 10002 |
| ⋮ | ⋮ | ⋮ |
| www.n.com | 1.1.1.1 | 10000 + (n-1) |

HOST TABLE

FIG.4

TRANSFER TABLE 36

| HOST NAME 77 | GLOBAL ADDRESS 78 | GLOBAL PORT 80 | LOCAL ADDRESS 82 | LOCAL PORT 84 |
|---|---|---|---|---|
| www.1.com | 1.1.1.1 | 10000 | 1.1.0.1 | 80 |
| www.2.com | 1.1.1.1 | 10001 | 1.1.0.2 | 80 |
| www.3.com | 1.1.1.1 | 10002 | 1.1.0.3 | 80 |
| ... | ... | ... | ... | ... |
| www.n.com | 1.1.1.1 | 10000 + (n-1) | 1.1.0.n | 80 |

SEQUENTIAL CHART CONTINUOUS FROM FIG. 5

ANOTHER EXEMPLARY CONFIGURATION OF COMMUNICATION SYSTEM

FIG.11

| FQDN | GLOBAL ADDRESS | GLOBAL PORT |
|---|---|---|
| www.1.com | 1.1.1.2 | 10000 |
| www.2.com | 1.1.1.2 | 10001 |
| www.3.com | 1.1.1.2 | 10002 |
| ⋮ | ⋮ | ⋮ |
| www.n.com | 1.1.1.2 | 10000 + (n-1) |

HOST TABLE

FIG.12

| GLOBAL ADDRESS | GLOBAL PORT | LOCAL ADDRESS | LOCAL PORT |
|---|---|---|---|
| 1.1.1.2 | 10000 | 1.1.0.1 | 80 |
| 1.1.1.2 | 10001 | 1.1.0.2 | 80 |
| 1.1.1.2 | 10002 | 1.1.0.3 | 80 |
| ⋮ | ⋮ | ⋮ | ⋮ |
| 1.1.1.2 | 100000 + (n-1) | 1.1.0.n | 80 |

TRANSFER TABLE

FIG.14

| FQDN | GLOBAL ADDRESS |
|---|---|
| www.1.com | 1. 1. 1. 2 |
| www.2.com | 1. 1. 1. 2 |
| www.3.com | 1. 1. 1. 2 |
| ⋮ | ⋮ |

140 / 142 / 138

MANAGEMENT TABLE

FUNCTION OF GATEWAY DEVICE

FIG.16

| FQDN (72) | GLOBAL ADDRESS (74) | GLOBAL PORT (76) | 38 |
|---|---|---|---|
| ~~www.1.com~~ | ~~1.1.1.1~~ | ~~10000~~ | 148 |
| www.2.com | 1.1.1.1 | 10001 | |
| www.3.com | 1.1.1.1 | 10002 | |
| ⋮ | ⋮ | ⋮ | |
| www.n.com | 1.1.1.1 | 10000 + (n-1) | |

HOST TABLE

FIG.17

| GLOBAL ADDRESS | GLOBAL PORT | LOCAL ADDRESS | LOCAL PORT |
|---|---|---|---|
| ~~1.1.1.1~~ | ~~10000~~ | ~~1.1.0.1~~ | ~~80~~ |
| 1.1.1.1 | 10001 | 1.1.0.2 | 80 |
| 1.1.1.1 | 10002 | 1.1.0.3 | 80 |
| ⋮ | ⋮ | ⋮ | ⋮ |
| 1.1.1.1 | 10000 + (n-1) | 1.1.0.n | 80 |

TRANSFER TABLE

PROCEDURE OF FAULT HANDLING PROCESS

EXEMPLARY CONFIGURATION OF REDIRECTION DEVICE AND GATEWAY DEVICE

COMMUNICATION DEVICE AND COMMUNICATION METHOD OF THE SAME

BACKGROUND OF THE INVENTION

1. Field of the Invention

The present invention relates to a communication device and a communication method of the same. Particularly, the communication device relates to a device that uses one global address as a representative of global IPv4 (Internet Protocol version 4) addresses, shares and manages the representative global address, and makes a relay between a WEB client located in a global space and a plurality of WEB servers located in a local space. Further, the communication method relates to an address sharing communication procedure in the case of using one global address as a representative of global IPv4 addresses, sharing and managing the representative global address, and making a relay between a WEB client located in a global space and a plurality of WEB servers located in a local space.

2. Description of the Related Art

Generally, when a WEB client uses various applications via an IP network, the WEB client makes a peer-to-peer connection with a WEB server that stores an application via the IP network and communicates therewith in the global space. In such a connection, an IP address is assigned to the WEB server with respect to each application for identification. Further, the WEB server is often mounted for each application that executes program processing. Accordingly, the number of WEB servers is on the increase in the global spaces and the local spaces. The increase raises concerns about the exhaustion of IPv4 addresses. Thus, there is an increasing demand for sharing a single IP address among a plurality of WEB servers.

In order to meet such a demand, a gateway device with a given function incorporates a large-scale data center and uses high-volume memory, and therefore the gateway device with a certain function becomes very expensive. The given function is a NAT (Network Address Translator) function which is proposed in RFC (Request For Comments) 1631 as a means to solve the lack of network addresses.

Specifically, a plurality of WEB servers to which local IP addresses or private IP addresses are assigned are connected to a local network (LAN). Hereinafter, a global IP address and a local IP address are referred to as a global address and a local address, respectively, for simplification. The NAT function communicates with a device that has an external global address by making shared use of a single global address for the respective WEB servers.

A device that performs address translation with use of the NAT function has been proposed. Japanese Unexamined Patent Application Publication No. 2002-152260 discloses a communication device with address translation function and a multimedia communication method, and Japanese Unexamined Patent Application Publication No. 2003-324482 discloses a gateway device with address translation function and an address translation method of the same.

In such a case, it is desirable to use the gateway device with the given function as described in M. Holdrege, "RFC2663-IP Network Address Translator (NAT) Terminology and Consideration", [online], Internet Association Japan, August 1998, [Searched on Sep. 10, 2009], Internet <URL:http://www.faqs.org/rfcs/rfc2663.html>. The gateway device with the given function has a function that terminates a TCP (Transmission Control Protocol) connection with an HTTP (Hyper-Text Transfer Protocol) client, analyzes an HTTP message and transfers it.

Further, IP masquerade or NAPT (Network Address Port Translation) is one of address translation methods. It is a similar function to the above-described NAT, and a different point is that NAPT translates a port number of TCP/UDP (Transmission Control Protocol/User Datagram Protocol) in addition to an IP address. By the translation function, a plurality of communication terminal devices or WEB servers on a LAN (Local Area Network) can establish an Internet connection by the simultaneous shared use of a single IP address.

However, it is known that a multimedia application is unable to communicate when using the IP masquerade.

As described above, communication up to the network layer in a one-to-many connection between a single device connected to a network in the global space and a plurality of devices connected to a network in the private space has been achieved until now. However, it should be noted that the IP masquerade is designed so as to efficiently achieve one-way communication that makes concurrent access from a plurality of devices connected to a network in the local space to a single device connected to a network in the global space. The NAT function only specifies one-to-one address translation between a device in the global space and a device in the private space.

SUMMARY OF THE INVENTION

Considering measures to respond to the exhaustion of IPv4 addresses, one way is to place WEB servers in the local address space for response. In this case, a WEB client acquires a global address corresponding to FQDN (Fully Qualified Domain Name) from a DNS (Domain Name System) server in advance.

FQDN is a domain name that specifies a domain name, a sub-domain name, a host name or the like in full on a network, i.e. a TCP/IP network such as the Internet or intranet.

In order to establish communication with a WEB client, a device with a given function (gateway device) is required to have the full TCP information between the WEB client in the global space and WEB servers in the private space, which are connected to a local network.

Further, in the execution of a recent WEB application, there is a high tendency that the WEB application simultaneously establishes several dozen TCP sessions to display one screen. This indicates that, when a request is made from a WEB client in the global space, a plurality of WEB servers in the local space are likely to operate simultaneously in response to the received request.

However, at the time of executing an application in a WEB server, a WEB client in the global space accesses the global address stored in a host header, namely, transmits an HTTP message having a destination domain name to the gateway device with the given function. At this time, when accessing the application layer, WEB servers are limited to use the port number "80" in the standard specification. Accordingly, the gateway device with the given function is unable to make connections to allow access from a plurality of WEB servers.

The gateway device with the given function receives TCP sessions, sequentially terminates the TCP sessions according to the operation of the WEB application, analyzes or identifies each HTTP message, translates a global address obtained by analysis to a local address, and then transfers the HTTP message to the WEB server having the local address, as specified in the above-mentioned M. Holdrege, "RFC2663-IP Network Address Translator (NAT) Terminology and Consideration.

In the case of manually operating such a procedure, a WEB client needs to manipulate the gateway device with the given function a plurality of times, and it is forced to perform complicated operation. With the complicated operation, the gateway device with the given function suffers an increase in processing loads such as analysis of received data.

In light of the foregoing, it is desirable to provide a communication device and a communication method of the same which can deal with IPv4 addresses exhaustion, improve the usability of a WEB client, and reduce processing loads.

According to an embodiment of the present invention, there is provided a communication device placed between a WEB client located in a global space and a WEB server located in a local space, which includes a host table that stores a global address and a global port corresponding to a host name of the WEB client, where the same value is set as the global address; a transfer table that stores a host name of the WEB client, a global address and a global port corresponding to the host name and stores a local address and a local port of the WEB server corresponding to the stored global address and global port, where the same value is set as the global address and the same value is set as the local port; and an analysis unit that analyzes a packet from the WEB client, supplies the global address and the global port according to a result of analysis to the WEB client that has made a request to perform HTTP (Hyper-Text Transfer Protocol) redirection, analyzes the HTTP-redirected global address, global port, local address and local port, translates the analyzed address and port and transfers a packet based on the translated address and port, wherein the analysis unit includes a sorting unit that determines whether a destination address of the packet supplied from the WEB client has a given value of a global address and a global port provided from a server that has authenticated a host name and sorts a supply destination of the supplied packet, a redirection unit that extracts a host name of the destination from the supplied packet, searches the host table for the extracted host name, and transmits a global address and a global port acquired by search to the WEB client that has made a request to perform HTTP redirection, and a translation/transfer unit that receives a packet from the sorting unit, searches the transfer table for a match with a destination global address and a destination global port of the received packet, changes the destination global address and the destination global port to a local address and a local port of the WEB server acting as the destination according to a search result, and transfers the changed packet to the destination WEB server, and, reversely, receives a packet from the WEB server, searches the transfer table for a match with a source local address and a source local port of the received packet, changes the source local address and the source local port to a global address and a global port of the WEB server acting as the source according to a search result, and transfers the changed packet to the WEB client.

According to an embodiment of the present invention, there is provided a communication method of a WEB client, a communication device and a WEB server, where the communication device is placed between the WEB client located in a global space and the WEB server located in a local space, which includes a first step of transmitting a packet containing a host name, a global address and a global port from the WEB client to the WEB server; a second step of receiving the packet by the device, determining whether a destination address of the packet has a given value of a global address and a global port provided from a server that has authenticated a host name, and sorting a supply destination of the supplied packet by a sorting unit that sorts a supply destination of the supplied packet; a third step of, when the determination is true, transmitting a global address and a global port acquired by a redirection unit that extracts a host name of the destination from the supplied packet, searches a host table that stores a global address and a global port corresponding to the host name as one entry for the extracted host name, and transmits a global address and a global port acquired by search to the WEB client that has made a request to perform HTTP (Hyper-Text Transfer Protocol) redirection, to the WEB client that has made a request to perform HTTP redirection; a fourth step of transmitting the packet from the WEB client changed to the global address and the global port supplied from the device to the destination and establishing communication between the WEB client and the device; a fifth step of changing an address and a port of a packet from global to local and transferring the changed packet to the destination WEB server by a translation/transfer unit that receives a request from the WEB client, and when the determination in the second step is false, searches a transfer table that stores a global address, a global port, a local address and a local port corresponding to the host name as one entry for a match with a destination global address and a destination global port of the received packet, changes the destination global address and the destination global port to a local address and a local port of the WEB server acting as the destination according to a search result, and transfers the changed packet to the destination WEB server; and a sixth step of changing an address and a port of a packet from local to global and transferring the changed packet to the WEB client by the translation/transfer unit that, when receiving the packet from the WEB server, searches the transfer table for a match with a source local address and a source local port of the received packet, changes the source local address and the source local port to a global address and a global port of the WEB server acting as the source according to a search result, and transfers the changed packet to the WEB client, wherein the method repeats the fifth step and the sixth step after that, the same value is set to the global address in the host table, and the same value is set to the global address and the same value is set to the local port in the transfer table.

According to an embodiment of the present invention, there is provided a communication device placed between a WEB client located in a global space and a WEB server located in a local space, which includes a redirection device including a host table that stores a global address and a global port corresponding to a host name of the WEB client, where the same value is set as the global address, a sorting unit that determines whether a destination address of a packet supplied from the WEB client has a given value of a global address and a global port provided from a server that has authenticated a host name and sorts a supply destination of the supplied packet, and a redirection unit that extracts a host name of the destination from the supplied packet, searches the host table for the extracted host name, and transmits a global address and a global port acquired by search to the WEB client that has made a request to perform HTTP (Hyper-Text Transfer Protocol) redirection; and a gateway device including a transfer table that stores a host name of the WEB client, a global address and a global port corresponding to the host name and stores a local address and a local port of the WEB server corresponding to the stored global address and global port, where the same value is set as the global address and the same value is set as the local port, and a translation/transfer unit that receives a packet from the sorting unit, searches the transfer table for a match with a destination global address and a destination global port of the received packet, changes the destination global address and the destination global port to a local address and a local port of the WEB server acting as the destination according to a search result, and transfers the changed packet to the destination WEB server, and, reversely, receives a packet from the WEB server, searches the transfer table for a match with a source local address and a source local port of the received packet, changes the source local address and the source local port to a global address and a global port of the WEB server acting as the source according to a search result, and transfers the changed packet to the WEB client.

According to the communication device and the communication method described above, the host table stores a global address and a global port corresponding to a host name of the WEB client, where the same value is set as the global address, and the transfer table stores a host name of the WEB client, and a global address, a global port, a local address and a local port corresponding to the host name, where the same value is set as the global address and the same value is set as the local port. The analysis unit analyzes a packet from the WEB client, supplies the global address and the global port according to a result of analysis to the WEB client that has made a request to perform HTTP (Hyper-Text Transfer Protocol) redirection, analyzes the HTTP-redirected global address, global port, local address and local port, translates the analyzed address and port and transfers a packet based on the translated address and port. In the analysis unit, the sorting unit determines whether a destination address of the packet supplied from the WEB client has a given value of a global address and a global port provided from a server that has authenticated a host name and sorts a supply destination of the supplied packet, the redirection unit extracts a host name of the destination from the supplied packet, searches the host table for the extracted host name, and transmits a global address and a global port acquired by search to the WEB client that has made a request to perform HTTP redirection, and the translation/transfer unit receives a packet from the sorting unit, searches the transfer table for a match with a destination global address and a destination global port of the received packet, changes the destination global address and the destination global port to a local address and a local port of the WEB server acting as the destination according to a search result, and transfers the changed packet to the destination WEB server, and, reversely, receives a packet from the WEB server, searches the transfer table for a match with a source local address and a source local port of the received packet, changes the source local address and the source local port to a global address and a global port of the WEB server acting as the source according to a search result, and transfers the changed packet to the WEB client, and then the procedure after connection establishment is repeated. Because the global address can be thereby shared by a plurality of WEB servers without terminating the TCP connection between the WEB client and the WEB servers, it is possible to improve the usability of the WEB client. Further, because the processing is divided and executed in the redirection unit and the translation/transfer unit, it is possible to reduce processing loads in the communication device.

According to the embodiments of the present invention described above, it is possible to provide a communication device which can deal with IPv4 addresses exhaustion, improve the usability of a WEB client, and reduce processing loads by addition of a minimum number of elements that are placed separately in the gateway device and the redirection device.

BRIEF DESCRIPTION OF THE DRAWINGS

FIG. 3 is a view showing a data structure of a host table held by the gateway device of FIG. 1 and an example of data contained therein.

FIG. 4 is a view showing a data structure of a transfer table held by the gateway device of FIG. 1 and an example of data contained therein.

FIG. 11 is a view showing a data structure of a host table held by the gateway device of FIG. 10 and an example of data contained therein.

FIG. 12 is a view showing a data structure of a transfer table held by the gateway device of FIG. 10 and an example of data contained therein.

FIG. 14 is a view showing a data structure of a management table in a dynamic DNS server applied to the communication system of FIG. 9.

FIG. 16 is a view showing a data structure of a host table held by the gateway devices of FIGS. 1 and 10 and an example of data contained therein.

FIG. 17 is a view showing a data structure of a transfer table held by the gateway devices of FIGS. 1 and 10 and an example of data contained therein.

DETAILED DESCRIPTION OF THE EMBODIMENT(S)

Figure 1:
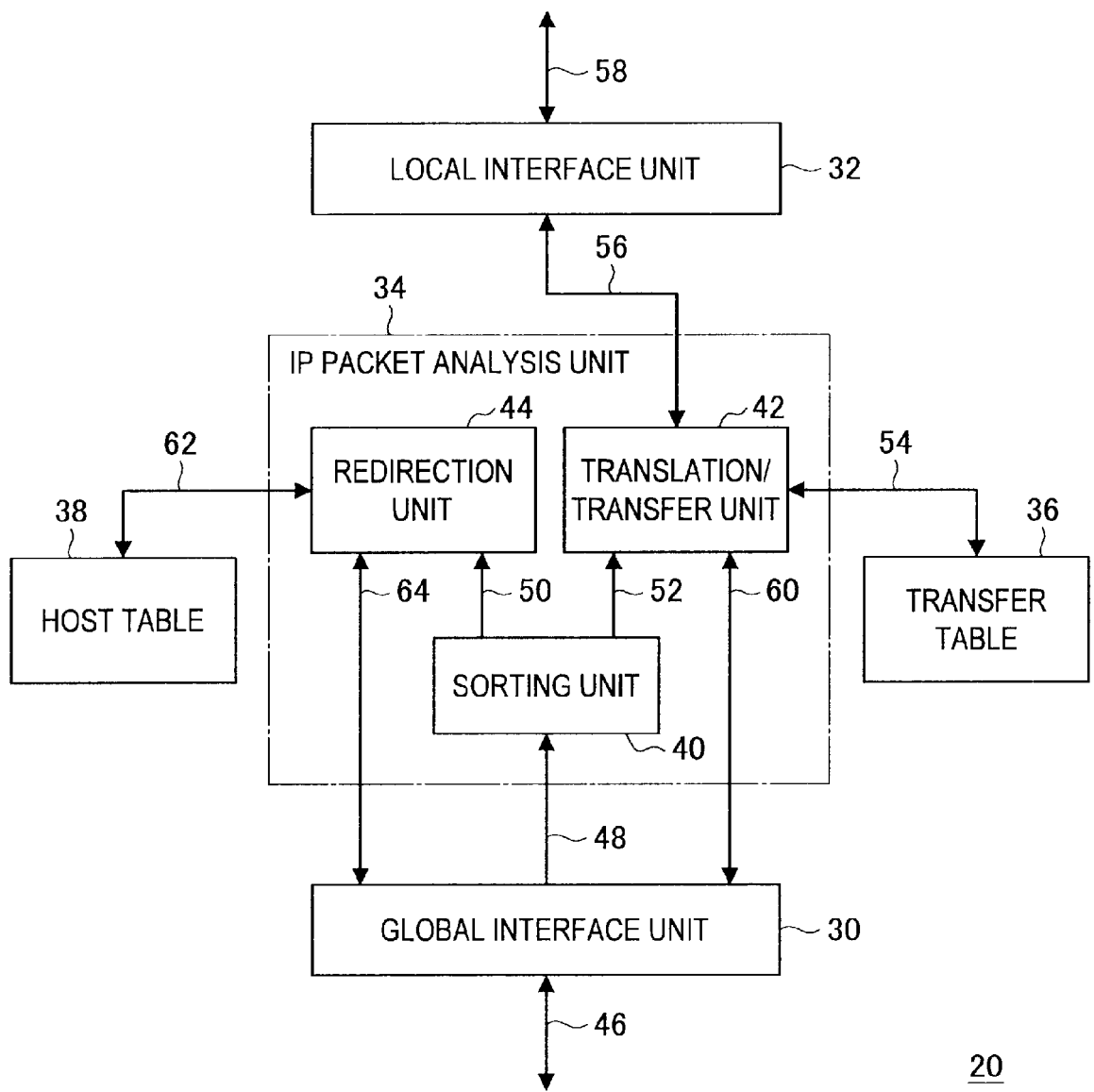
FIG. 1 is a block diagram showing a schematic configuration of a gateway device that applies a communication device according to an embodiment of the present invention.

Hereinafter, exemplary embodiments of the present invention will be described in detail with reference to the appended drawings. Referring to FIG. 1, a communication device according to an embodiment of the present invention is characterized by a gateway device. In a gateway device 20, a host table 38 stores a global address and a global port corresponding to a host name of a WEB client, where the same value is set to the global address, a transfer table 36 stores a host name of a WEB client, and a global address, a global port, a local address and a local port corresponding to the host name, where the same value is set to the global address and the same value is set to the local port, and an IP packet analysis unit 34 analyzes a packet 48 from a WEB client, supplies the global address and the global port according to a result of analysis to the WEB client that has made a request to perform HTTP redirection, analyzes the HTTP-redirected global address and global port and a local address and a local port, translates the analyzed address and port and transfers a packet 56 based on the translated address and port. Further, in the IP packet analysis unit 34, a sorting unit 40 determines whether a destination address of the packet supplied from the WEB client has the given value of the global address and the global port provided from a server that has authenticated a host name and sorts the supply destination of the supplied packet, a redirection unit 44 extracts a host name of the destination from the supplied packet 50, searches the host table 38 for the extracted host name, and transmits the global address and the global port acquired by search to the WEB client that has made a request to perform HTTP redirection, and a translation/transfer unit 42 receives a packet 52 from the sorting unit 40, searches the transfer table 36 for a match with the destination global address and the destination global port of the received packet 52, changes the destination global address and the destination global port to a local address of the destination WEB server and a destination local port according to a search result, and transfers the changed packet 56 to the destination WEB server, and, reversely, receives a packet 56 from the WEB server, searches the transfer table 36 for a match with the source local address and the source local port of the received packet 56, changes the source local address and the source local port to a global address of the source WEB server and a source global port according to a search result, and transfers the changed packet 60 to the WEB client. After that, the process after connection establishment is repeated. Because the global address can be thereby shared by a plurality of WEB servers without terminating the TCP connection between the WEB client and the WEB servers, it is possible to improve the usability of the WEB client. Further, because the processing is divided and executed in the redirection unit 44 and the translation/transfer unit 42, it is possible to reduce processing loads in the communication device.

It should be noted that illustration and description of the part that is not directly relevant to the present invention are omitted. In the following description, a signal is indicated by a reference number of a connection line where it appears.

In this embodiment, the communication device according to the present invention is applied to a gateway device. Although the elements connected to a network are the same as before, the gateway device according to the embodiment only includes an element having a feature to address the above concern. Further, by applying the gateway device according to the embodiment, communication between a plurality of devices in a global space and a plurality of devices in a private space is established. Thus, the connection enables many-to-many communication.

Figure 2:
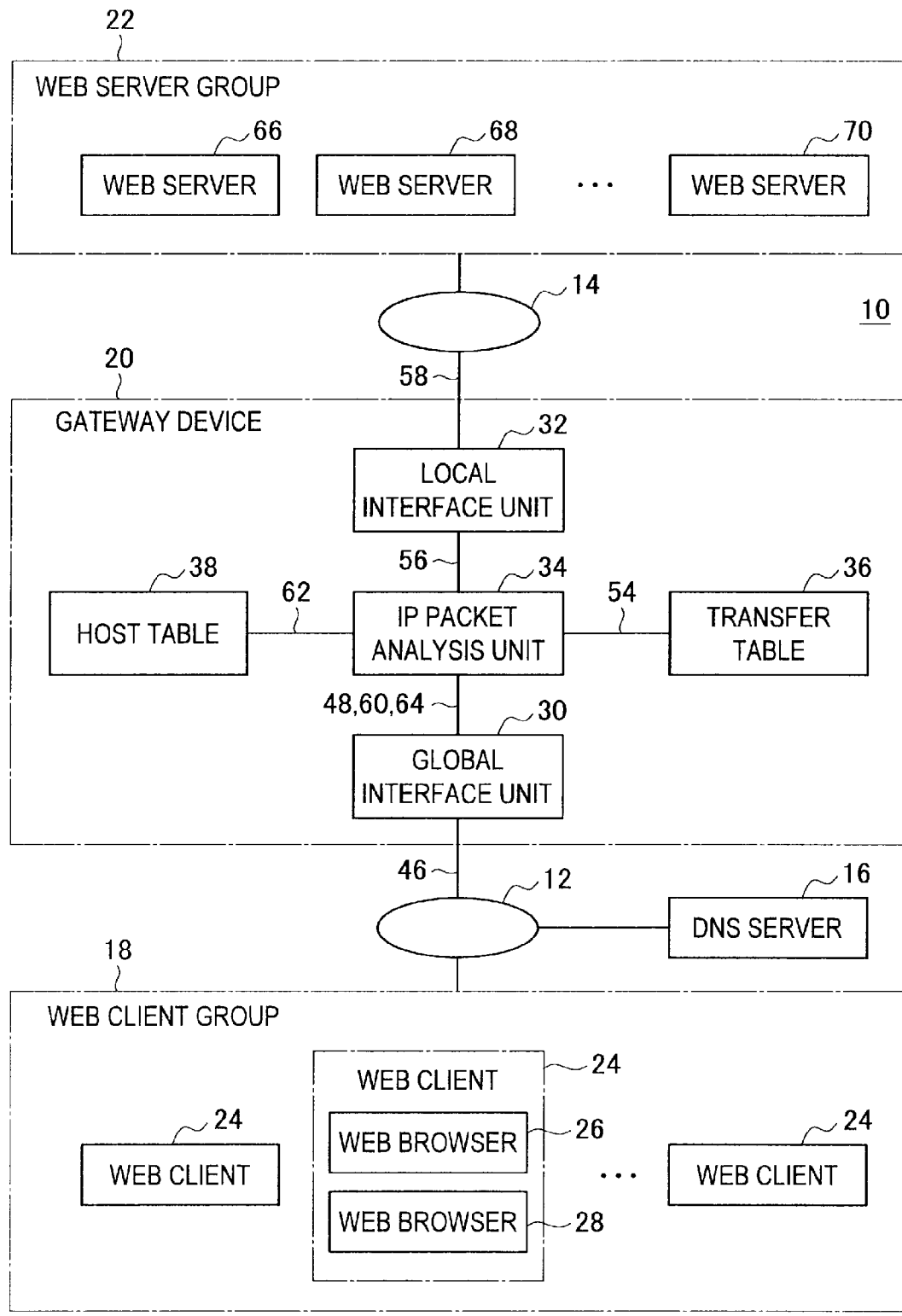
FIG. 2 is a block diagram showing a schematic configuration of a communication system that applies the gateway device of FIG. 1.

Basically, a communication device 10 is constructed by an IP network 12 and a local network (LAN) 14 as shown in FIG. 2. The IP network 12 is a network that communicates by using a global IPv4 address in a global space. The LAN 14 is a network that communicates by using a local address in a private space.

A DNS server 16, a WEB client group 18 and the gateway device 20 are connected to the IP network 12. On the other hand, the gateway device 20 and a WEB server group 22 are connected to the LAN 14.

The DNS (Domain Name System) server 16 is a computer or server software that associates a format that allows a user to easily understand a host identifier, i.e. a domain name, with a format that allows a computer to easily understand it, i.e. an IP address. When a domain name or an IP address is requested from the WEB client group 18 or the gateway device 20 connected to the IP network 12, the DNS server 16 acquires the IP address in the global space corresponding to the domain name and transmits the acquired information to a device or software that has made a request.

The WEB client group 18 has N number of WEB client functions connected to the IP network 12. Each element of the WEB client group 18 is called a WEB client. The WEB client 24 includes a computer terminal device or a WEB browser. The WEB client 24 may include a plurality of WEB browsers 26 and 28 as software in a personal computer (PC), for example. The WEB client group 18 in this embodiment includes N number of WEB clients 24 and WEB browsers 26 and 28.

The gateway device 20 includes a global interface (IF) unit 30, a local interface (IF) unit 32, the IP packet analysis unit 34, the transfer table 36, and the host table 38. The global interface unit 30 has a function that enables two-way transmission between the gateway device 20 and the global address space. The local interface unit 32 has a function that enables two-way transmission between the gateway device 20 and the local address space.

The IP packet analysis unit 34 includes the sorting unit 40, the translation/transfer unit 42 and the redirection unit 44 as shown in FIG. 1. The IP packet analysis unit 34 has a function that analyzes a packet from the WEB client 24, supplies a global address and a global port according to a result of analysis to the WEB client 24 that has made a request to perform redirection, analyzes the redirected global address and global port and a local address and a local port, translates the analyzed address and port and then transfers a packet based on the translated addresses and ports.

In the IP packet analysis unit 34, the sorting unit 40 has a function that determines whether a destination IP address of the packet 48 which is supplied through the global interface unit 30, out of the packet 46 received from the IP network 12, is a given global address supplied from the DNS server 16 and whether a TCP port (global port) is a given value, i.e. a standard value 80, and sorts the packet to be supplied. The sorting unit 40 transmits an IP packet 50 to the redirection unit 44 under the applicable conditions, and transmits an IP packet 52 to the translation/transfer unit 42 under the other conditions, e.g. when it is after communication establishment and determined not to be a value from the DNS server 16.

The translation/transfer unit 42 has a function that, upon receiving the IP packet 52 from the sorting unit 40, searches for the entry of the transfer table 36 with the global address and the global port that match the destination IP address and the destination port number of the IP packet 52. The translation/transfer unit 42 has a translation function that outputs a search request signal 54 to the transfer table 36 and, if there is a matching entry, receives a search result 54 and changes the destination IP address and the destination port number of the IP packet 52 to the local address and the local port of the entry stored in the transfer table 36. The translation/transfer unit 42 then transmits the packet 56 that has changed to the local address and the local port to the local interface unit 32. The local interface unit 32 supplies the translated packet 56 to the destination WEB server as a packet 58.

Further, the translation/transfer unit 42 has a function that, upon receiving the IP packet 56 from the local interface unit 32, searches for the entry of the transfer table 36 with the local IP address and the local port that match the source local address and the source local port of the IP packet 56. The translation/transfer unit 42 has a function that outputs the search request signal 54 to the transfer table 36 and, if there is a matching entry, changes the source IP address and the source port number of the IP packet 56 to the global address and the global port of the entry stored in the transfer table 36, the IP masquerade or the NAPT function. The translation/ transfer unit 42 then transmits the packet 60 that has changed to the global address and the global port to the global interface unit 30. The global interface unit 30 outputs the received packet 60 to the WEB client that has made a request as an IP packet 46.

The redirection unit 44 has a function that receives an HTTP request contained in the packet 50 from the sorting unit 40 and extracts a host header of the HTTP request. In the host header, a host name that is supplied as a destination is extracted. Further, the redirection unit 44 has a function that searches for a host name of the host table 38 based on the host name in the acquired host header. The redirection unit 44 outputs a search request signal 62 to the host table 38. The redirection unit 44 searches the host table 38 in response to the search request signal 62. The redirection unit 44 further has HTTP redirection function that transmits the global address and the global port acquired as a search result to the WEB client that has made a request for rewrite to the global address and the global port.

In practice, if the redirection unit 44 receives a search result 62 indicating the presence of the corresponding entry in the host table 38, it transmits a response 64 for redirection to the WEB client that has made a request and executes HTTP redirection. The response 64 has a status code "3xx", for example. The response 64 contains a location header. The location header contains the IP address and the port number of the corresponding entry stored in the host table 38.

Particularly, the HTTP redirect function is a function that notifies a change in URL (Uniform Resource Locator), which is one type of a response from a server in HTTP that is used for data transmission and reception in www (world wide web). Status code 301 and 302 are codes for HTTP redirection, and "301 Moved Permanently" indicates that the page is permanently moved, and "302 Moved Temporarily" indicates that the page is temporarily prepared in another place. Note that it is changed to code 307 in HTTP 1.1. Most of WEB browsers automatically recognize the code and read the redirected URL. This is used in distinction from simple redirection.

The host table 38 has a data set made up of elements of a host name (FQDN) area 72, a global address area 74 and a global port area 76 as shown in FIG. 3. In this embodiment, the global address area 74 uses the same value "1.1.1.1", and names in the host name area 72 are used for discrimination. By setting the same value to the values of the global address area 74 and setting different ports to the plurality of FQDNs, the exhaustion of IPv4 IP addresses and the limitation by the specification of the HTTP port "80" are prevented.

Note that, although the numeric value of the global port of www.n.com is "1000(n−1)", it is described as "10000+(n−1)" to avoid misinterpretation.

The transfer table 36 stores a data set made up of elements of a global address area 78, a global port area 80, a local address area 82 and a local port area 84 as one entry. Reference number 77 designates a host name (FQDN) area. In this embodiment, the global address area 78 uses "1.1.1.1", and the local port area 84 uses the value "80" which is specified in HTTP. The transfer table 36 is designed to enable connection and communication from the global space even when a plurality of WEB servers 66, 68 and 70 are included in the LAN 14. In this configuration, for a plurality of FQDN addressees, a single local server corresponding to the respective FQDNs performs NAPT with one another to thereby establish a connection with the WEB client.

The reason that the host table 38 and the transfer table 36 are placed in this embodiment is described hereinbelow.

Usually, in the case of establishing communication between a device on the LAN 14 side as a transmission source and a device in the global space, a gateway device or a router can create a translation table and is thus able to communicate with the device in the global space by the NAPT function. On the other hand, in the case of establishing communication between a device on the IP network 12 side as a transmission source and a device in the local space, a gateway device or a router has no translation table and is thus unable to communicate with the device in the local space. Further, because a local address specified for use in the local space is not available in the global space, a gateway device or a router is unable to create a translation table unless communication is made from the device on the LAN 14 side.

However, in the case of placing a WEB server on the LAN 14 side and making a connection from the global space, a broadband bundle router, for example, communicates with the WEB server on the LAN 14 side by translating the global port "80" in the device on the IP network 12 side to "192.168.0.2:80", for example, as address:port by the NAPT function. Further, in the case of making communication from the global space to a network camera on the LAN 14 side, it communicates with the network camera by translating the global port "8080" in the device on the IP network 12 side to "192.168.0.3:8080", for example, as address:port by the NAPT function. By exerting the NAPT function with use of a different port number, the WEB server and the network camera placed on the LAN 14 side become open to the device connected on the IP network 12 side.

However, as described earlier, even when a plurality of WEB servers are placed in the local space, it is unable to make all of the plurality of WEB servers open to the device connected on the IP network 12 side. This is because the global port specified as the standard value in HTTP is already used in a broadband router, and it is thus unable to relay the communication received with the global port "80" to the second and third WEB servers.

The standard value specified in HTTP is briefly described. The global port "80" is one of "WELL KNOWN PORT NUMBER", and it relates to HTTP and is managed by IANA (Internet Assigned Number Authority).

The WEB server group 22 is an aggregate of n-number of WEB servers 66, 68, . . . , 70, and it is connected to the LAN 14. The WEB servers 66, 68, . . . , 70 have a WEB server function. Further, n-number of local addresses are respectively assigned to the WEB servers 66, 68, . . . , 70.

Figure 5:
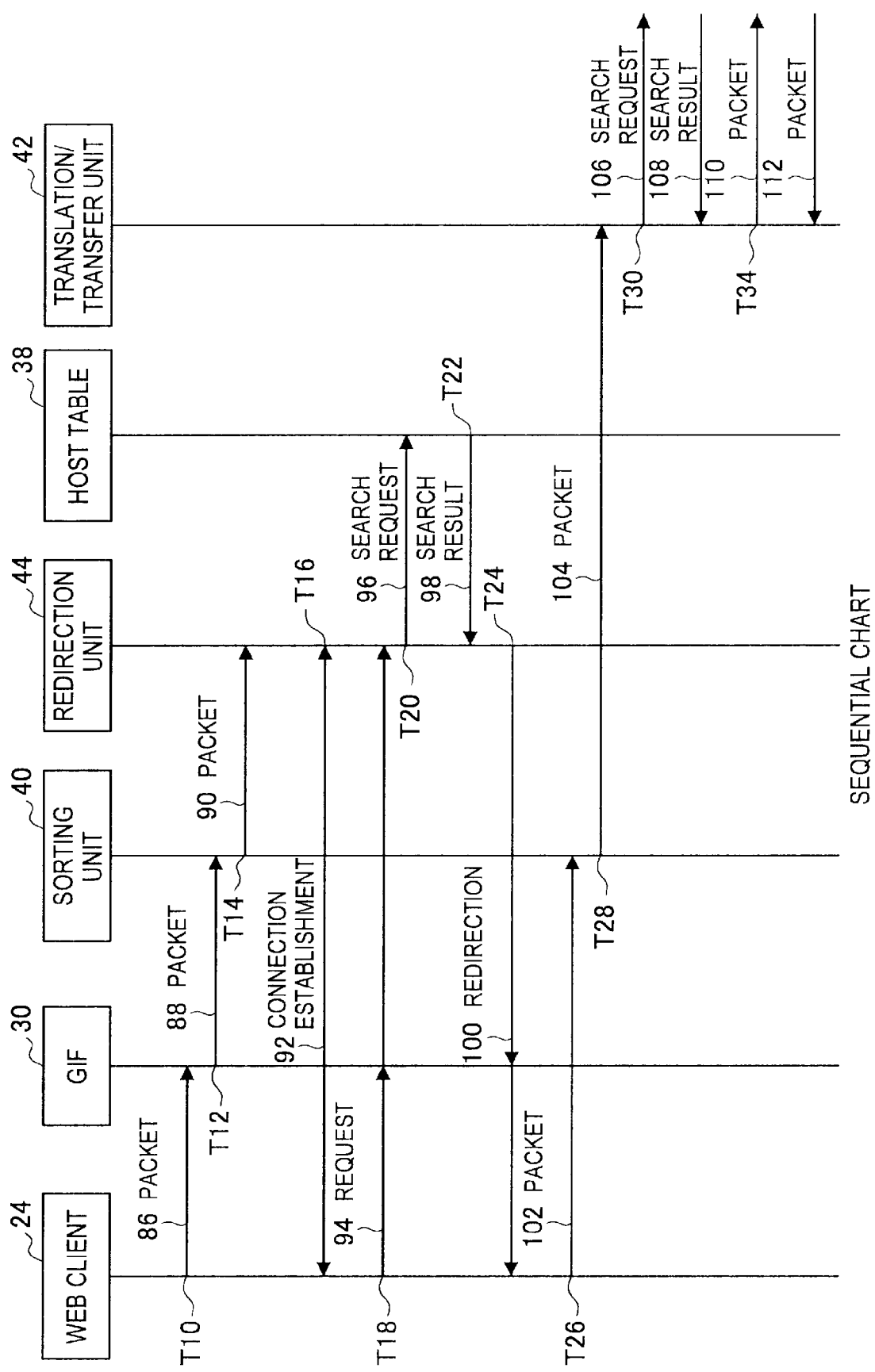
FIG. 5 is a sequential chart showing an operational procedure in the communication system of FIG. 2.

The operation of the gateway device 20 that applies the communication device according to the embodiment of the present invention is described hereinafter with reference to the communication device 10. The destination of communication of the WEB client 24 shown in FIG. 5 is the WEB server 66 in the WEB server group 22, and the operation that accesses the WEB server 66 is shown in FIGS. 5 to 8. The FQDN of the WEB server 66 is www.1.com.

The WEB client 24 acquires the global address "1.1.1.1" of the WEB server 66 as an address 0, for example, by the DNS server 16. After acquisition, at time T10, the WEB client 24 transmits a TCP packet 86 that contains the global address "1.1.1.1" and the port "80" in the post header to the WEB server 66 with FQDN: www.1.com as a destination. It is specified that the data contained in the host header may be written in alphanumeric characters such as "1.1.1.1:80". The TCP packet 86 is received by the global interface unit 30 of the gateway device 20.

At time T12, the global interface unit 30 outputs the supplied TCP packet 88 to the sorting unit 40. At time T14, the sorting unit 40 outputs the supplied TCP packet 88 as a TCP packet 90 to the redirection unit 44. The operation of the global interface unit 30 is omitted.

At time T16, the redirection unit 44 establishes one-to-one communication with the WEB client 24 (connection establishment 92). By the establishment of a connection, the first stage of the connection procedure ends, and the process immediately proceeds to the next connection procedures, i.e. the procedure of NAT processing and the procedure of NAPT processing, which are described later.

At time T18, the WEB client 24 transmits an HTTP request 94 having the host header "www.1.com" to the redirection unit 44. The redirection unit 44 receives the HTTP request 94 and recognizes the destination address "1.1.1.1" and the host header "www.1.com".

Then, at time T20, the redirection unit 44 outputs a search request signal 96 for searching whether the host table 38 contains FQDN:www.1.com in the supplied request 94. At time T22, the host table 38 transmits a search result 98 to the redirection unit 44. The redirection unit 44 determines the presence or absence of a desired FQDN based on the search result 98. If there is a desired FQDN, the redirection unit 44 acquires the value "1.1.1.1:10000" of the global address 74 and the global port 76 which are set corresponding to FQDN 72:www.1.com. If, on the other hand, there is no desired FQDN, the redirection unit 44 stores www.1.com into the FQDN 72, sets the value "1.1.1.1:1000n" of the global address 74 and the global port 76 corresponding to the FQDN and stores it into each data area, and acquires those values.

The redirection unit 44 generates a packet 100 that contains the value of the global address 74 and the global port 76 acquired corresponding to the desired FQDN. The feature is that a single global address is used for a plurality of FQDNs, and different ports, other than "80", are set for the plurality of FQDNs.

At time T24, the redirection unit 44 outputs an HTTP redirection code (3xx) 100 as a generated packet to the WEB client 24 through the global interface unit 30. The location is the global address "1.1.1.1" and the global port "10000". By such operation, in response to access from the respective WEB clients 24, communication can be established for each of them without limited to either one. Because the global addresses of the WEB servers of the WEB server group 22 which are set to the respective FQDNs are represented by one value, it is possible to prevent the exhaustion of addresses. Further, because a value different from "80" is used as the value of the global port, it is possible to deal with applications by a plurality of WEB clients without rejecting access from the WEB client in the global space.

The WEB client 24 receives the HTTP redirection from the redirection unit 44 and, at time T26, transmits a TCP packet 102 with the global address:global port "1.1.1.1:10000" to the sorting unit 40.

At time T28, the sorting unit 40 transmits the supplied TCP packet 102 as a packet 104 to the translation/transfer unit 42. The translation/transfer unit 42 recognizes that the destination address of the packet 104 is the global address "1.1.1.1" and the destination port is the global port "10000".

Figure 6:
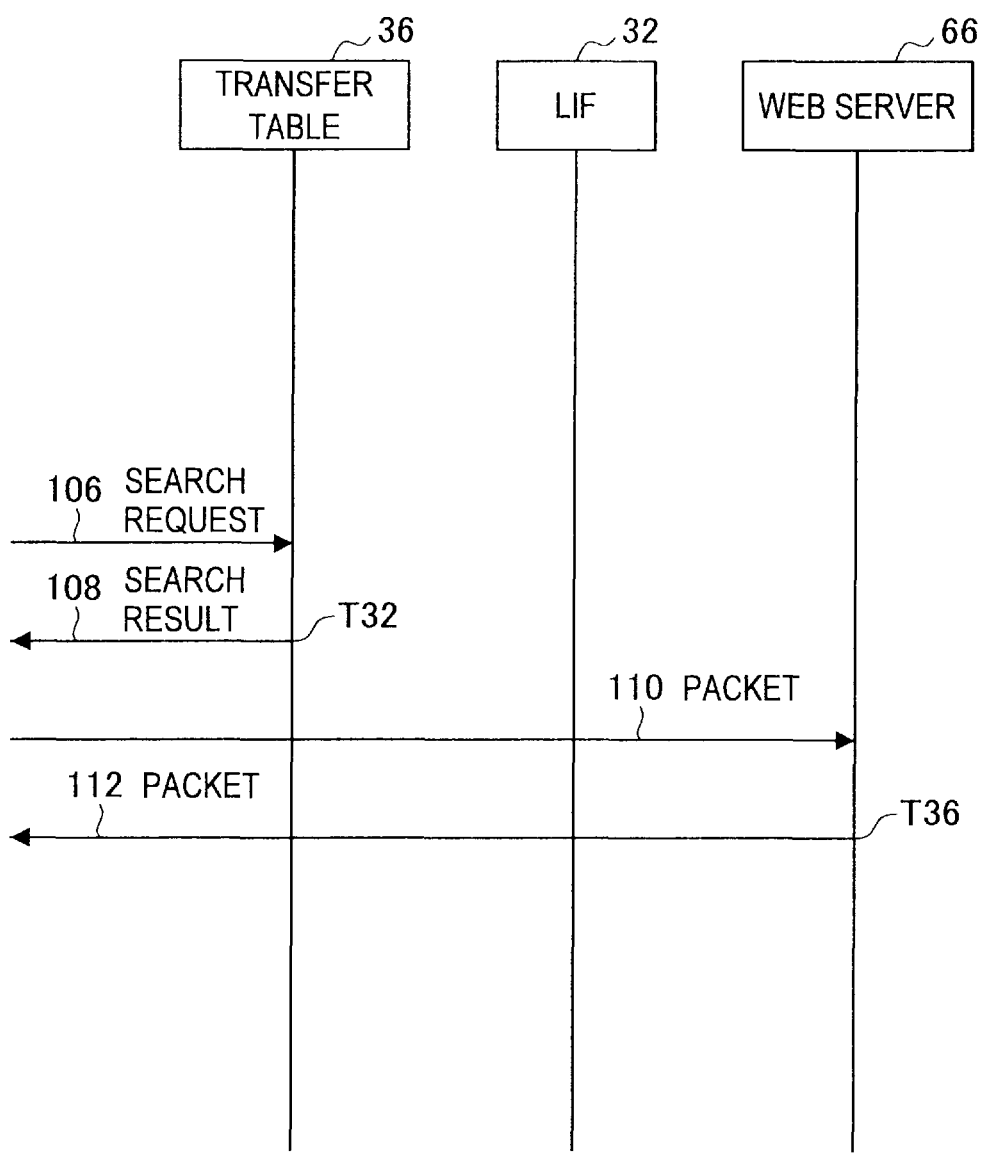
FIG. 6 is a sequential chart continuous from FIG. 5.
Figure 7:
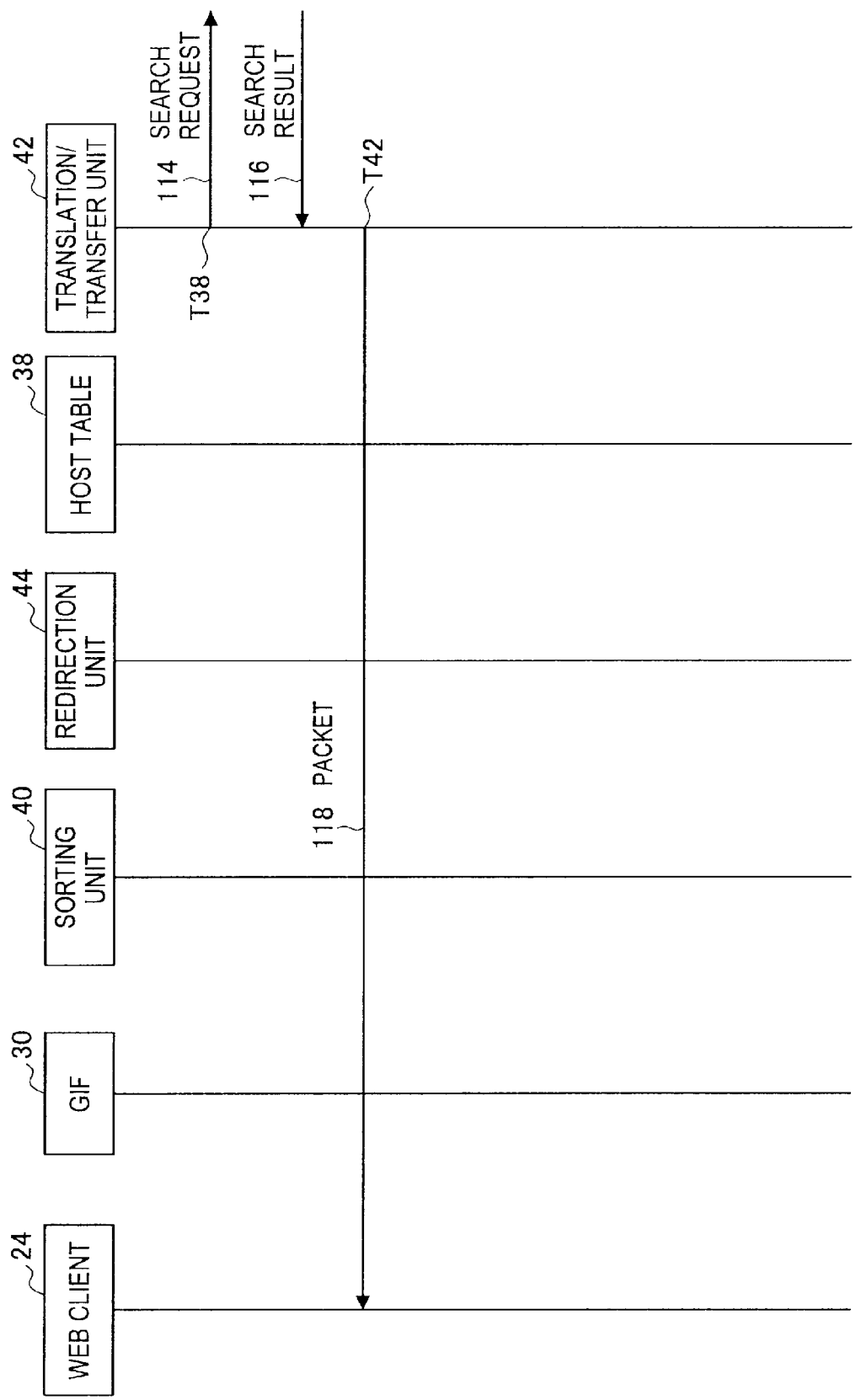
FIG. 7 is a sequential chart continuous from FIGS. 5 and 6.
Figure 8:
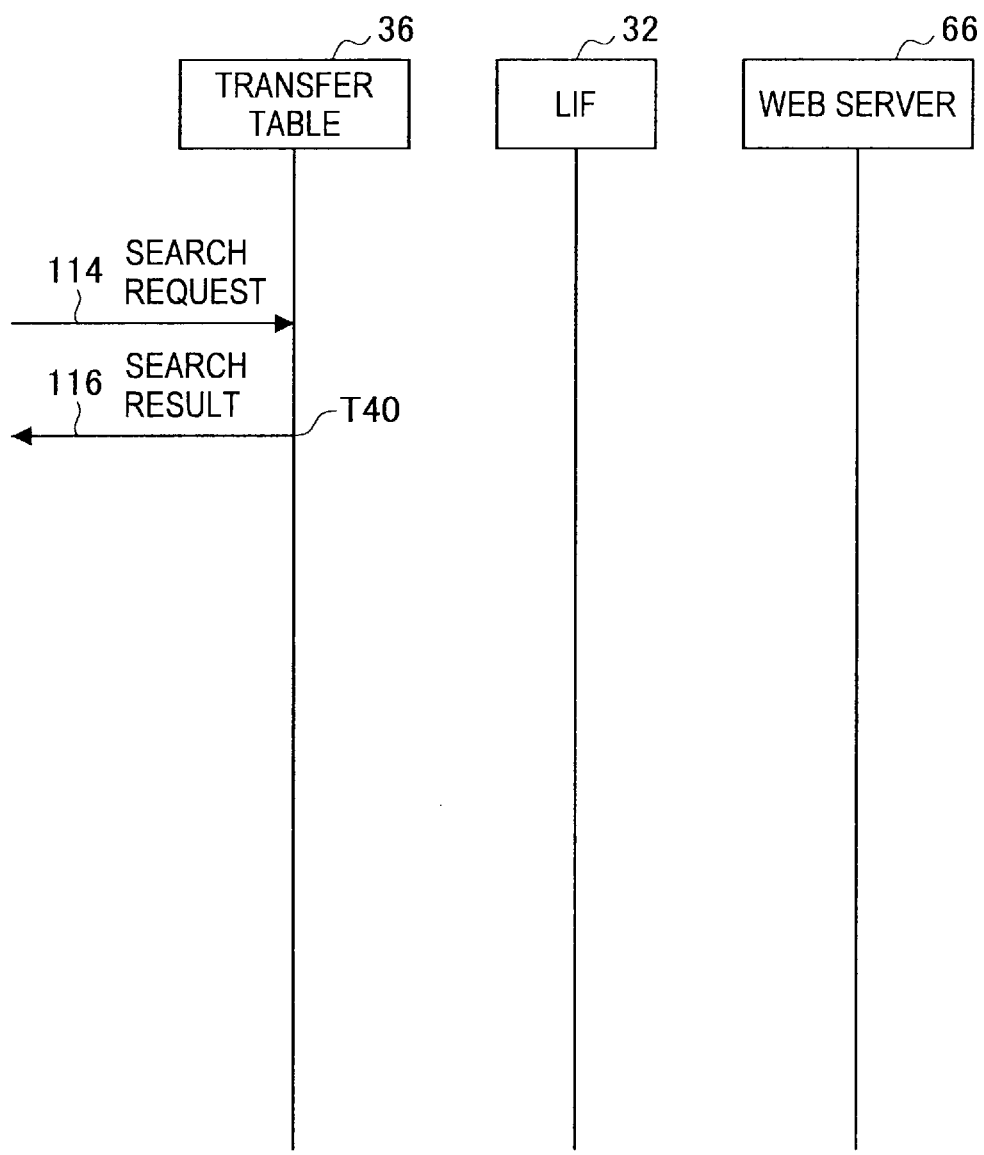
FIG. 8 is a sequential chart continuous from FIG. 7.

At time T30, the translation/transfer unit 42 outputs a search request 106 for searching whether the transfer table 36 has the global address "1.1.1.1" and the global port "10000" to the transfer table 36 of FIG. 6. The transfer table 36 searches for the value "1.1.1.1:10000" of the global address area 78 and the global port area 80 and acquires the values of the local address 82 and the local port 84. At time T32, the transfer table 36 sends a search result 108 back to the translation/transfer unit 42 of FIG. 5. The translation/transfer unit 42 thereby acquires the local address "1.1.0.1" and the local port "80".

The translation/transfer unit 42 translates the destination address of the IP packet, i.e. the global address "1.1.1.1", to the local address "1.1.0.1" and translates the destination port, i.e. the global port "10000", to the local port "80", and then transmits a translated packet 110 to the LAN 14 through the local interface unit 32.

When the packet 110 is transmitted from the gateway device 20, the WEB server 66 determines whether the packet 110 is relevant or not. The WEB server 66 receives the packet 110 when it has the relevant local address "1.1.0.1".

At T36, the WEB server 66 transmits a packet 112 with the source IP address "1.1.0.1" and the source port "80" to the translation/transfer unit 42. The translation/transfer unit 42 receives the packet 112 and recognizes that the source address of the packet 112 is "1.1.0.1" and the source port is "80".

At T38, the translation/transfer unit 42 outputs a search request 114 to the transfer table 36. At time T40, the transfer table 36 searches for the local address "1.1.0.1" and the local port "80" and acquires the global address "1.1.1.1" and the global port "10000" corresponding to the local address "1.1.0.1" and the local port "80" as a search result 116.

The translation/transfer unit 42 translates the packet transmission source address to the global address "1.1.1.1" and translates the source port to the global port "10000". At time T42, the translation/transfer unit 42 transmits a packet 118 with the translated source address "1.1.1.1" and source port "10000" to the IP network 12.

The WEB client 24 receives the packet 118 with the source address "1.1.1.1" and the source port "10000".

After that, TCP communication between the WEB client 24 and the WEB server 66 repeats the procedure from the time T26 to the time T42. HTTP communication between the WEB client 24 and the WEB server 66 is thereby enabled.

As described above, the gateway device 20 performs communication with use of normal TCP packets at first, shares one global address for a plurality of FQDNs, sets different global ports for them, performs direction, and makes communication by using the global address and the global port provided by redirection, thereby avoiding the HTTP specification of "WELL KNOWN PORT NUMBER". Further, the gateway device 20 translates the global address and the global port to the local address and the local port and communicates with the WEB server, and translates the local address and the local port of the WEB server to the global address and the global port and communicates, thereby establishing a connection and making communication with the WEB client with respect to each of a plurality of FQDN addresses without terminating the TCP connection with the WEB servers in one local space corresponding to the respective FQDNs.

Figure 9:
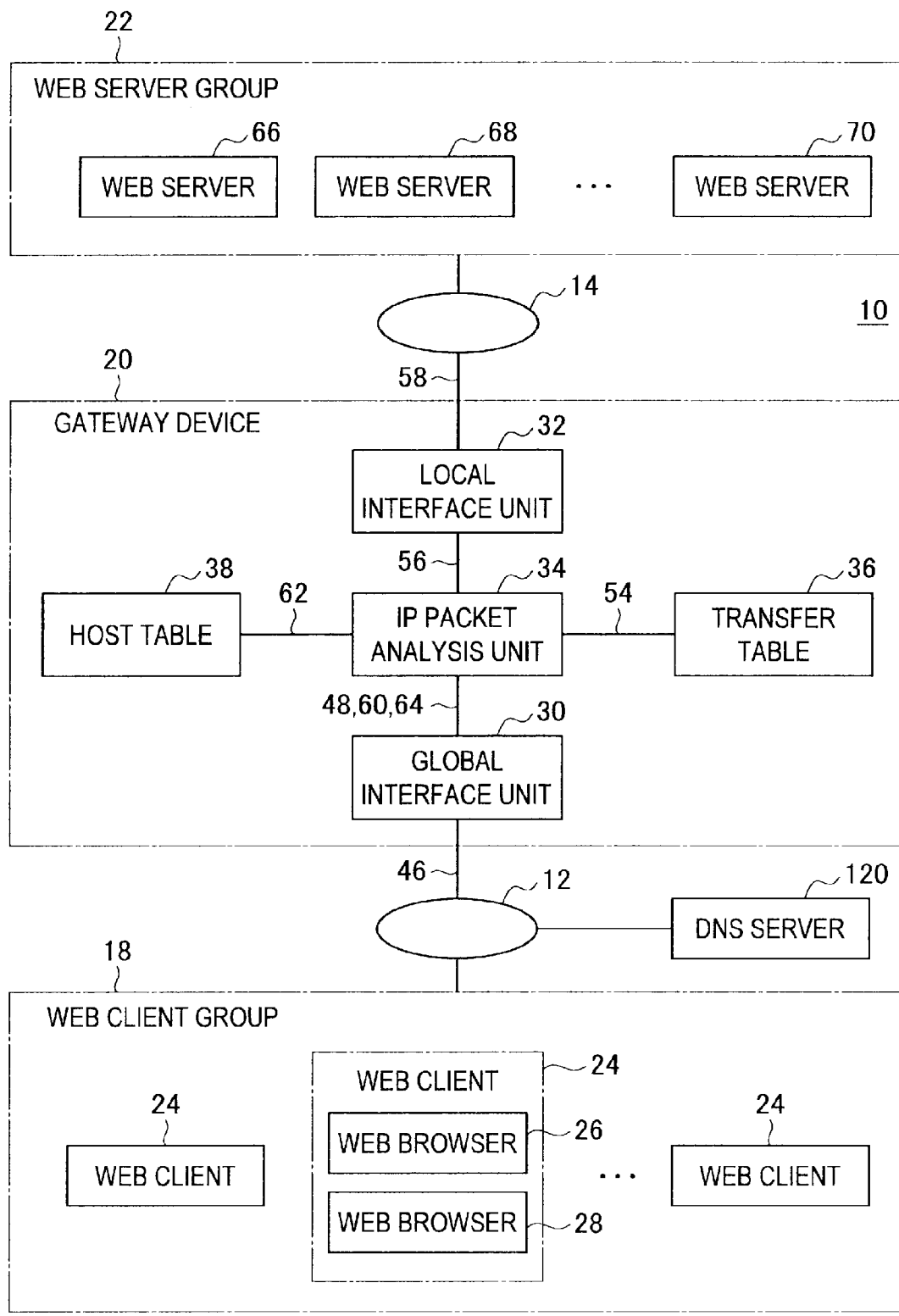
FIG. 9 is a block diagram showing a schematic configuration of the communication system of FIG. 2 according to another embodiment.

In the communication system 10 according to the embodiment shown in FIG. 2, a DDNS (dynamic DNS) server 120 may be placed instead of the DNS server 16 as an element as shown in FIG. 9. The DDNS server 120 is a server having a function that dynamically updates a DNS database, which is specified in RFC2136.

In the case of making a home personal computer open to the public as a WEB server with use of the continuous connection environment, an IP address or a host name mechanically assigned by a provider is a sequence of numerals, alphabets or symbols that make no substantial sense. Thus, the host name is information that is not adequate to be made open and known to the public. Further, the DNS server 16 often assigns a new IP address every disconnection from or reconnection to a network. On the other hand, the DDNS server 120 provides a service that assigns a unique host name to a home personal computer in the continuous connection environment by updating DNS records with respect to each connection. This is to deal with the case where the gateway device 20 according to the embodiment changes the address.

There are two types of DDNS service provision of the DDNS server 120: one is by a provider that specializes in providing a DDNS server, and the other is by a provider that provides the continuous connection environment.

This embodiment is different from the above-described embodiment in that the gateway device 20 can change the global address, and it is characterized in that one global address that is set as a representative of the respective global addresses is shared by a plurality of WEB servers.

Figure 10:
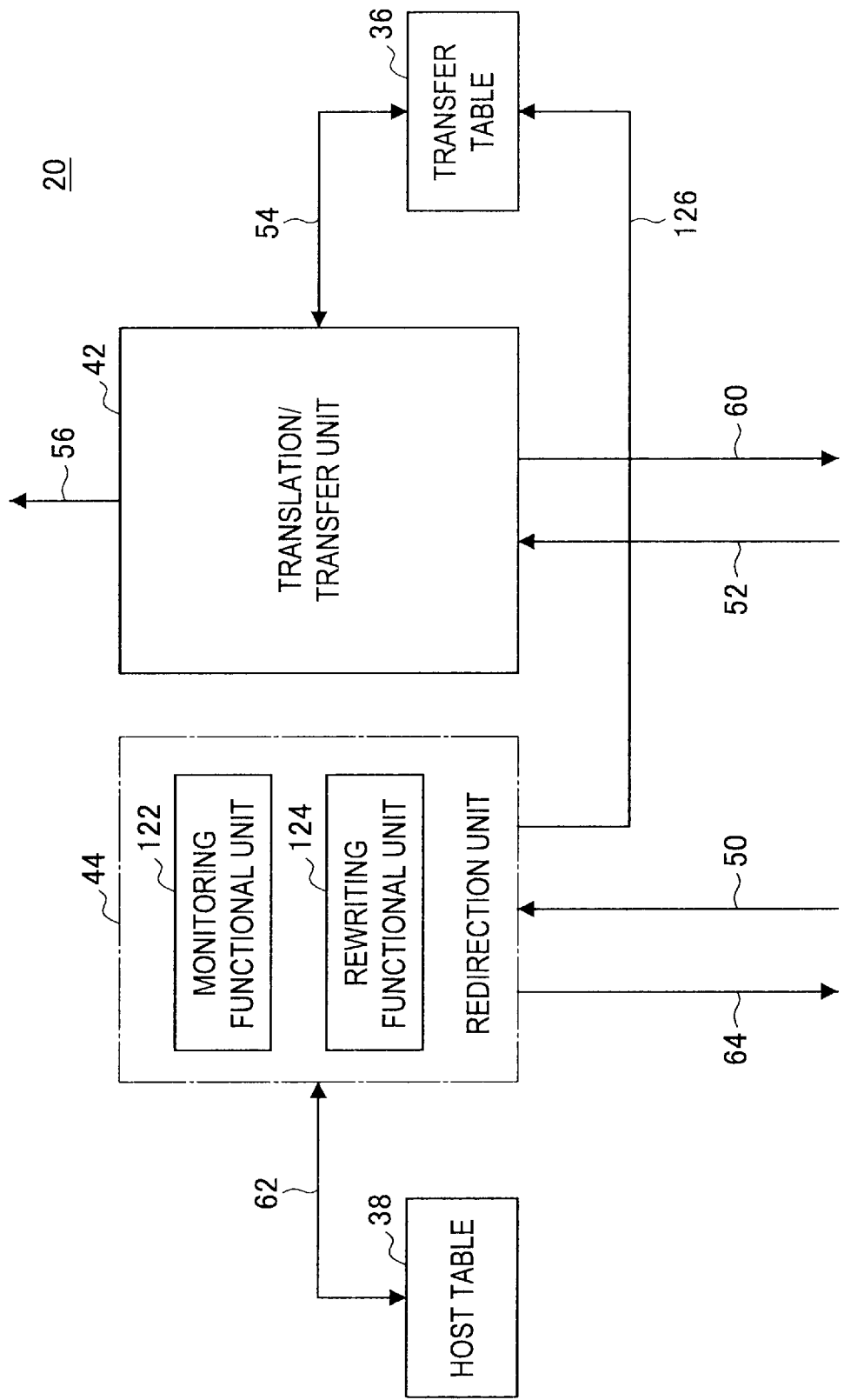
FIG. 10 is a block diagram showing a configuration of a substantial part of the gateway device applied to the communication system of FIG. 9 in an enlarged scale.

The gateway device 20 has the same elements as those in the above-described embodiment. FIG. 10 shows a substantial part of the gateway device 20. Referring to FIG. 10, the redirection unit 44 includes a monitoring functional unit 122 that detects a change in the global address value of a supplied packet itself, and a rewriting functional unit 124 that, when a change is detected, changes the global address value of the corresponding entry in the host table 38 and the transfer table 36. In addition to the functions described in the above embodiment, the redirection unit 44 rewrites the value of the host table 38 to supplied data 62 and stores it by the rewriting functional unit 124. Further, the redirection unit 44 rewrites the value of the transfer table 36 to supplied data 126 and stores it by the rewriting functional unit 124.

The data structures of the transfer table 36 and the host table 38 are respectively the same as those in the above-described embodiment.

However, the global address 74 of the host table 38 is rewritten to the value "1.1.1.2" as shown in FIG. 11 from the value "1.1.1.1" in FIG. 3. Further, the global address 78 of the transfer table 36 is also rewritten to the value "1.1.1.2" as shown in FIG. 12 from the value "1.1.1.1" in FIG. 4. It is noted that the host name area is not shown in FIG. 4.

Figure 13:
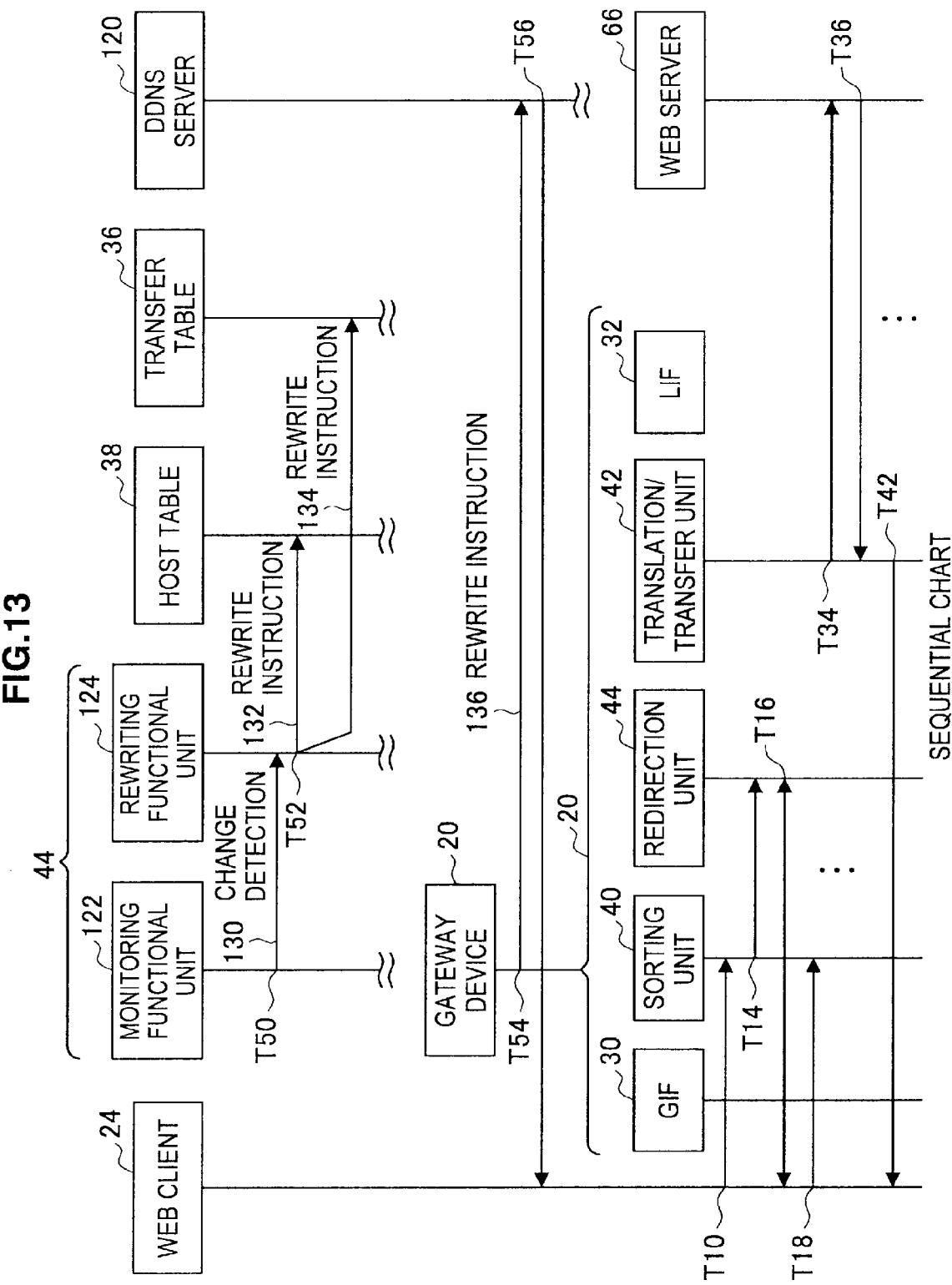
FIG. 13 is a sequential chart showing an operational procedure in the communication system of FIG. 9.

The operation of the gateway device 20 that applies the communication device according to the embodiment of the present invention is described hereinafter with reference to the communication device 10. The destination of communication of the WEB client 24 shown in FIG. 9 is the WEB server 66 in the WEB server group 22, and the operation that accesses the WEB server 66 is shown in FIG. 13. The FQDN of the WEB server 66 to be accessed is www.1.com.

The gateway device 20 acquires the global address of the FQDN 72 www.1.com by the DNS server 16, for example. The monitoring functional unit 122 of the redirection unit 44 in the gateway device 20 monitors whether the value of the global address 74 for the FQDN 72 is changed from "1.1.1.1" to a different value at predetermined intervals. At T50, the monitoring functional unit 122 supplies a change detection 130 to the rewriting functional unit 124 upon detection of a change in the value of the global address 74 for the FQDN 72 www.1.com from "1.1.1.1" to "1.1.1.2".

At T52, the rewriting functional unit 124 supplies rewrite instructions 132 and 134 to the host table 38 and the transfer table 36, respectively, and rewrites the value of the global address 74 to "1.1.1.2".

At time T54, the gateway device 20 supplies a rewrite instruction 136 to the DDNS server 120. The DDNS server 120 rewrites a management table 138 shown in FIG. 14 to the supplied value. The management table 138 changes the value of the global address 142 corresponding to the FQDN 140 to "1.1.1.2".

At T56, the DDNS server 120 outputs a changed value 138 of the global address to the WEB client under management. The WEB client 24 checks the host name corresponding to the own FQDN and stores the supplied global address value. In this address setting, the communication system 10 operates in the procedures from the time T10 by the WEB client 24 to the time T42 by the translation/transfer unit 42 in the above-described embodiment.

After that, TCP communication between the WEB client 24 and the WEB server 66 repeats the procedure from the time T26 to the time T42. HTTP communication between the WEB client 24 and the WEB server 66 is thereby enabled.

By such operation, the gateway device 20 monitors whether there is a change in the global address value under management and, when a change is detected, rewrites the global address values in the host table 38 and the transfer table 36, rewrites the management table 138 of the DDNS server 120 and gives notification to the WEB client, thereby enabling dealing with a change in the global address and shared use of one global address by a plurality of WEB servers without terminating the TCP connection between the WEB client and the WEB server.

Figure 15:
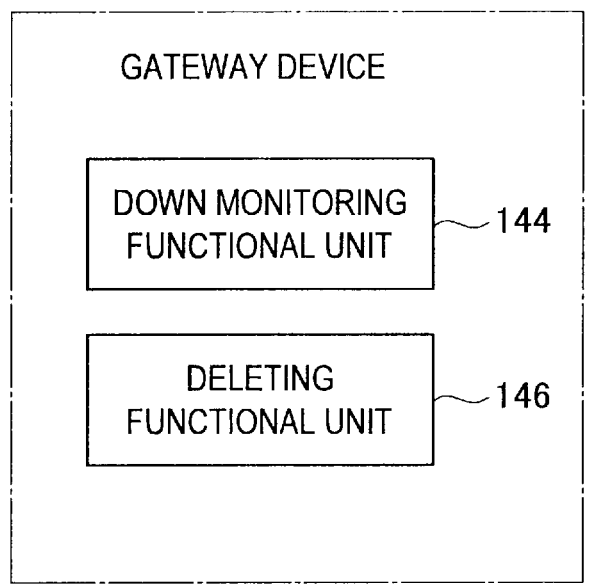
FIG. 15 is a scaled block diagram showing functions of the gateway devices of FIGS. 1 and 10.

The functions in the gateway device 20 are briefly described hereinafter with reference to FIG. 15. Referring to FIG. 15, the gateway device 20 shown in FIGS. 1 and 10 includes a down monitoring functional unit 144 and a deleting functional unit 146. The down monitoring functional unit 144 is a function that detects whether a device, e.g. a WEB server, in the local space is down. The down monitoring functional unit 144 is same as the function that operates by the "ping" command, for example. The "ping" is a command for issuing an IP packet to a host to request acknowledgement for the network connectivity and checking whether the IP packet correctly arrives and a response is made.

When down is detected by the down monitoring functional unit 144, the deleting functional unit 146 deletes the entry of the corresponding host name in the FQDN 72 area of the host table 38 and also deletes the corresponding entry in the global address 78 area of the transfer table 36. For example, when down is detected at www.1.com by the down monitoring functional unit 144, the corresponding entry 148 is deleted in the host table 38 of FIG. 16, and the corresponding entry 150 is deleted in the transfer table 36 of FIG. 17 (in which the host name area is not illustrated).

Figure 18:
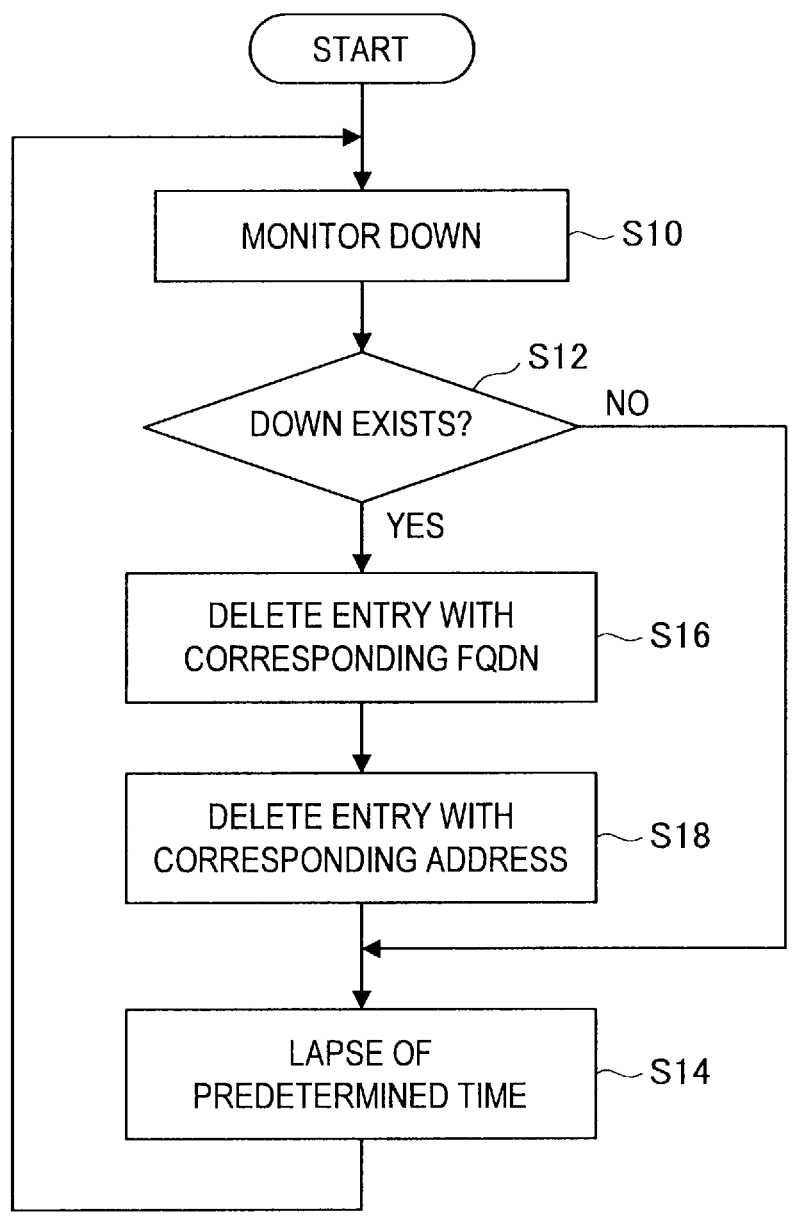
FIG. 18 is a flowchart showing an operational procedure of a fault handling process of the host table and the transfer table in the gateway devices of FIGS. 1 and 10.

The processing of the gateway device 20 when a device in the local space is down is described hereinbelow. Referring to FIG. 18, in the gateway device 20 shown in FIGS. 1 and 10, the down monitoring functional unit 144 monitors down of devices connected to the LAN 14, i.e. the WEB server group 22 in this embodiment (step S10). The monitoring is performed in the same manner as the "ping" command, for example.

Then, it is determined whether down is contained in a monitoring result (step S12). When down is not contained (NO), namely, when it is executed normally, it is generally determined that the LAN 14 between hosts is normal, and the process proceeds to standby (step S12). Further, when down exists (YES), the host name of FQDN where a failure occurs is acquired, and the process proceeds to deletion (step S16).

Next, the deleting functional unit 146 deletes the entry of the corresponding host name in the FQDN 72 area of the host table 38 (step S16). Then, the deleting functional unit 146 deletes the corresponding entry in the global address 78 area of the transfer table 36 (step S18). After that, the process proceeds to standby (to step S12).

The standby mode makes the monitoring wait for a predetermined time period. After the lapse of the predetermined time period, the process returns to the down monitoring (to step S10). The monitoring repeats such a procedure.

By such operation, even when the WEB client 24 or the WEB browser 26 accesses www.1.com as FQDN in this situation, because there is no entry corresponding to www.1.com in the host table 38 or the transfer table 36, the gateway device 20 can immediately send an error, i.e. a response code 404, to the transmission source. It is thus possible to end the service promptly, thereby eliminating useless processing time and enabling quick reply.

Hereinafter, another embodiment of the gateway device 20 that applies the communication device according to the present invention and a redirection device 152 is briefly described with reference to FIG. 19. Although the gateway device 20 according to the above-described embodiment includes all of the IP packet analysis unit 34, the transfer table 36 and the host table 38, this embodiment is not limited thereto. The gateway device 20 according to the embodiment includes the basic elements as a gateway device, such as the global interface unit 30, the local interface unit 32, the transfer table 36 and the translation/transfer unit 42. A different point is that the data of the global address is the same value and the data of the local port is also the same value in the transfer table 36 as shown in FIG. 4.

Figure 19:
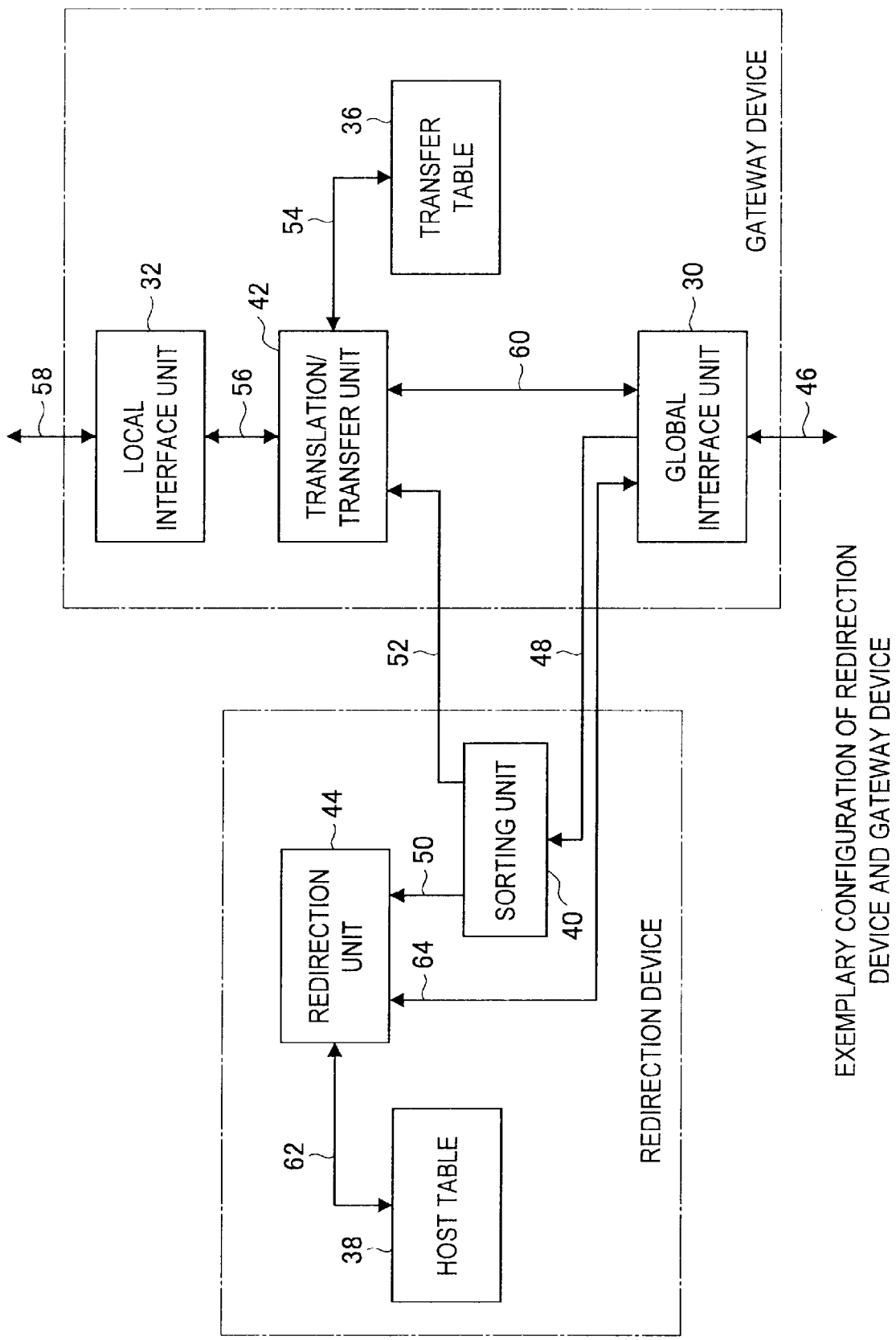
FIG. 19 is a block diagram showing a schematic configuration of a redirect device and a gateway device that apply a communication device according to an embodiment of the present invention.

Referring to FIG. 19, the redirection device 152 includes the host table 38, the sorting unit 40 and the redirection unit 44. In order to constitute the redirection device 152 with a minimum number of elements, the sorting unit 40 is connected so as to receive a packet 48 from the global interface unit 30 and output a packet 50 to the redirection unit 44 or output a packet 52 to the translation/transfer unit 42 according to an analysis result. Further, the redirection unit 44 is connected to be able to communicate with the global interface unit 30.

The embodiments of FIGS. 1, 10 and 15 can be achieved by connecting the elements of the gateway device 20 and the redirection device 152 in this manner and making communication as a matter of course. In this configuration, it is possible to prevent the exhaustion of IPv4 addresses and enable mutual communication between the external global space and a plurality of WEB servers placed in the local space simply by adding the redirection device 152.

It should be noted that, although a communication method that does not depend on the HTTP specification of an application in the transport layer is described by way of illustration in the above embodiments, the present invention is not limited thereto, and it is possible to enable communication that avoids the specification in the application layer by setting values in the tables or the procedures.

Further, the present invention is not limited to the above-described embodiments, and it is applicable to the case of establishing communication with one device of a gateway and each WEB server by use of technology such as a virtual operating system (OS).

The present application contains subject matter related to that disclosed in Japanese Priority Patent Application JP 2009-226773 filed in the Japan Patent Office on Sep. 30, 2009, the entire content of which is hereby incorporated by reference.

What is claimed is:

1. A communication device placed between a plurality of WEB clients located in a global space and a plurality of WEB servers located in a local space, comprising:
   a processor and at least one memory, configured to provide:
      a host table that stores global addresses and global ports corresponding to FQDN (Fully Qualified Domain Name) including domain name, sub-domain name, and host name of the WEB servers, where the same value is set as the global address for all of the WEB servers, and different values are set as the global ports for all the WEB server;
      a transfer table that stores the FQDNs of the WEB servers and the global addresses and the global ports corresponding to the FQDNs, the transfer table additionally storing local addresses and local ports of the WEB servers corresponding to the stored global addresses and global ports, where the same value is set as the global address and the same value is set as the local port for all of the WEB servers, and different values are set as the global ports and local ports for all the WEB servers; and
      an analysis unit that analyzes packets from the WEB clients that make requests to perform HTTP (Hyper-Text Transfer Protocol) redirection and, for each request, supplies one of the global addresses and one of the global ports according to a result of the analysis, analyzes the HTTP-redirected global address, global port, local address and local port, translates the analyzed address and port, and transfers the packet based on the translated address and port,
   wherein the host table and the transfer table are stored in the at least one memory,
   wherein the analysis unit includes:
      a sorting unit that determines whether a destination address of a packet supplied from one of the WEB clients has a given value of a global address and a global port provided from a WEB server that has authenticated a FQDN and sorts a supply destination of the supplied packet,
      a redirection unit that extracts a FQDN of the destination from the supplied packet, searches the host table for the extracted FQDN, and transmits a global address of the WEB server and a global port of WEB server acquired as a result of the search to the WEB client that made the request to perform HTTP redirection, and
      a translation/transfer unit that receives the packet from the sorting unit, searches the transfer table for a match with a destination global address and a destination global port of the received packet, changes the destination global address and the destination global port to a local address and a local port of the WEB server acting as the destination according to the result of the search, and transfers the changed packet to the destination WEB server, and, reversely, receives a packet from said one of the WEB servers, searches the transfer table for a match with a source local address and a source local port of the received packet, changes the source local address and the source local port to a global address and a global port of the WEB server acting as the source according to a further search result, and transfers the changed packet to the WEB client, and
   wherein the redirection unit includes:
      a down monitoring functional block that detects whether the WEB server in the local space is down by using a command for issuing an IP packet to a host to request acknowledgement and checking whether the IP packet arrives correctly and a response is made; and
      a deleting functional block that deletes an entry of a corresponding FQDN in the host table and an entry corresponding to a global address in the transfer table in response to detection that the WEB server in the local space is down.

2. The communication device according to claim 1, wherein the redirection unit includes:
   a monitoring functional block that detects a change in a global address value of the supplied packet; and a rewriting functional block that changes a global address value of an corresponding entry in the host table and the transfer table in response to detection of a change in the global address value.

3. A communication device placed between a WEB client located in a global space and a WEB server located in a local space, comprising:
  a processor and at least one memory, configured to provide:
    a redirection device including:
      a host table that stores a global address and a global port corresponding to a host name of the WEB client, where the same value is set as the global address for the WEB client and at least one further WEB client,
      a sorting unit that determines whether a destination address of a packet supplied from the WEB client has a given value of a global address and a global port provided from a server that has authenticated a host name and sorts a supply destination of the supplied packet, and
      a redirection unit that extracts a FQDN (Fully Qualified Domain Name) of the destination from the supplied packet, searches the host table for the extracted host name, and transmits a global address and a global port acquired by search to the WEB client that has made a request to perform HTTP (Hyper-Text Transfer Protocol) redirection; and
    a gateway device including:
      a transfer table that stores the FQDN of the WEB server, a global address and a global port corresponding to the FQDN and stores a local address and a local port of the WEB server corresponding to the stored global address and global port, where the same value is set as the global address and the same value is set as the local port for the WEB server and the at least one further WEB server, and different values are set as the global ports for the WEB server and the at least one further WEB server, and
      a translation/transfer unit that receives a packet from the sorting unit, searches the transfer table for a match with a destination global address and a destination global port of the received packet, changes the destination global address and the destination global port to a local address and a local port of the WEB server acting as the destination according to a search result, and transfers the changed packet to the destination WEB server, and, reversely, receives a packet from the WEB server, searches the transfer table for a match with a source local address and a source local port of the received packet, changes the source local address and the source local port to a global address and a global port of the WEB server acting as the source according to a search result, and transfers the changed packet to the WEB client,
  wherein the transfer table and the host table are stored in the at least one memory, and
  wherein the redirection device further includes:
    a down monitoring functional block that detects by a ping command whether the WEB server in the local space is down; and
    a deleting functional block that deletes an entry of a corresponding FQDN in the host table and an entry corresponding to a global address in the transfer table in response to detection that the WEB server is down.

4. The communication device according to claim 3, wherein the redirection device further includes:
  a monitoring functional block that detects a change in a global address value of the supplied packet; and
  a rewriting functional block that changes a global address value of an corresponding entry in the host table and the transfer table in response to detection of a change in the global address value.

* * * * *